INVENTORS:
WILLIAM E. GOOD,
MICHAEL GRASER, JR.
BY Julius C. Zeitlick
THEIR ATTORNEY March 7, 1967
W. E. GOOD ET AL
3,308,230
MONOCHROME PROJECTION SYSTEM WITH FIRST
AND SECOND ORDER DIFFRACTION
Filed Dec. 18, 1964
6 Sheets-Sheet 3
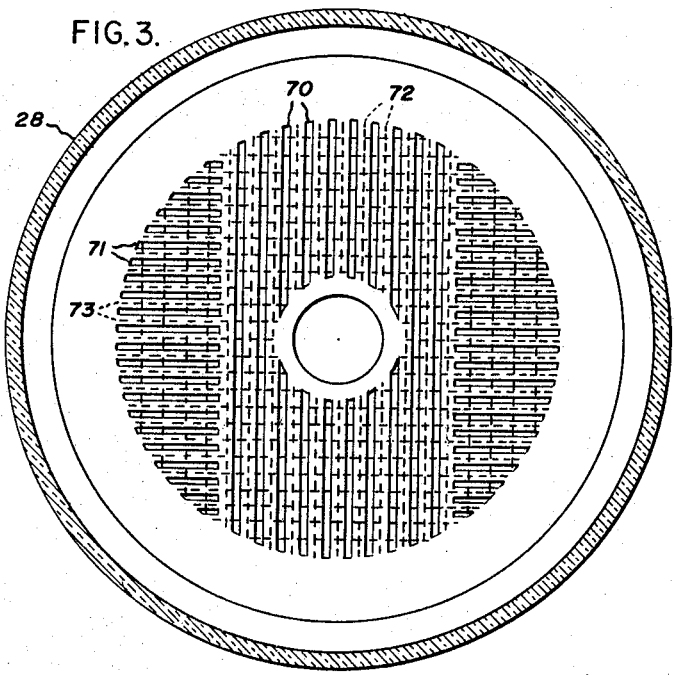
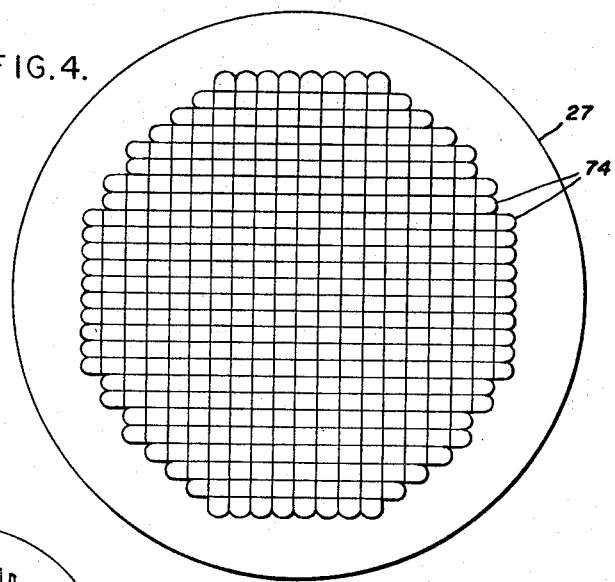
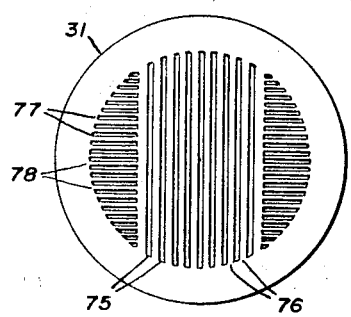
INVENTORS:
WILLIAM E. GOOD,
MICHAEL GRASER, JR.
By Julius J. Zaskalicky
THEIR ATTORNEY.

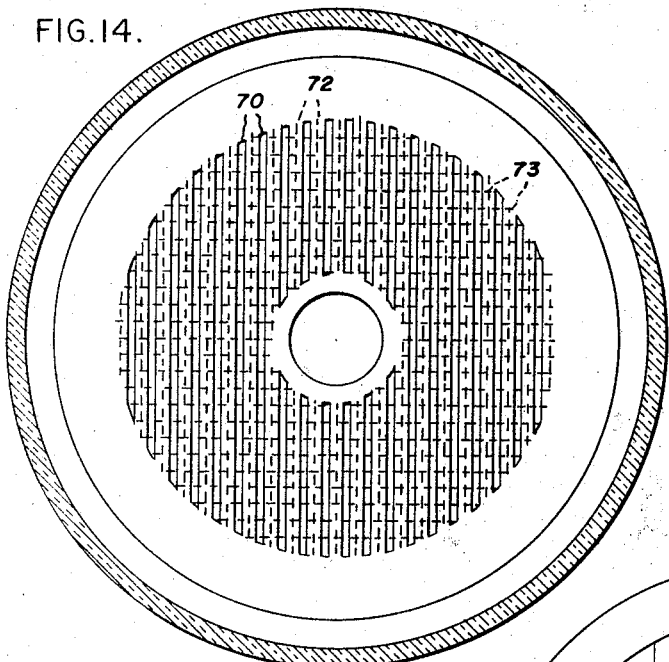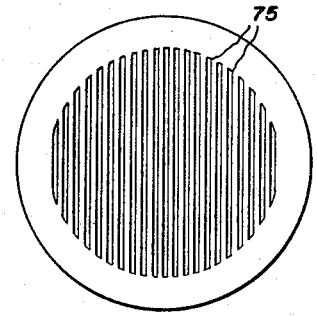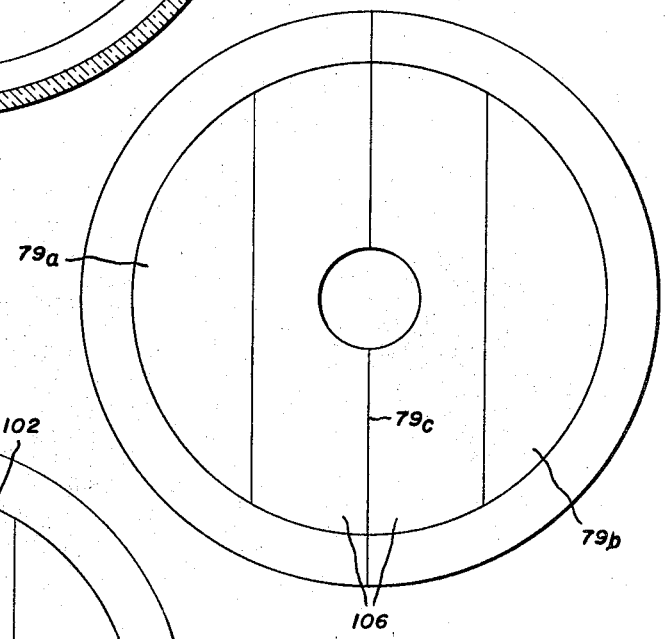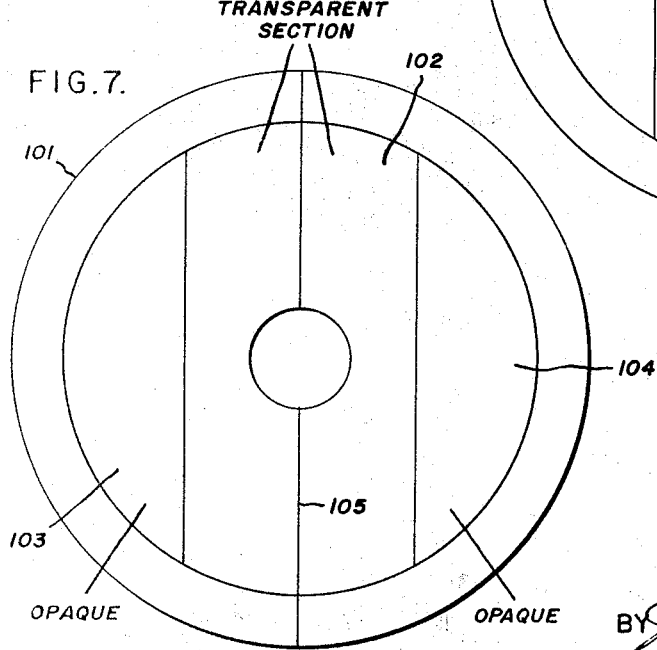

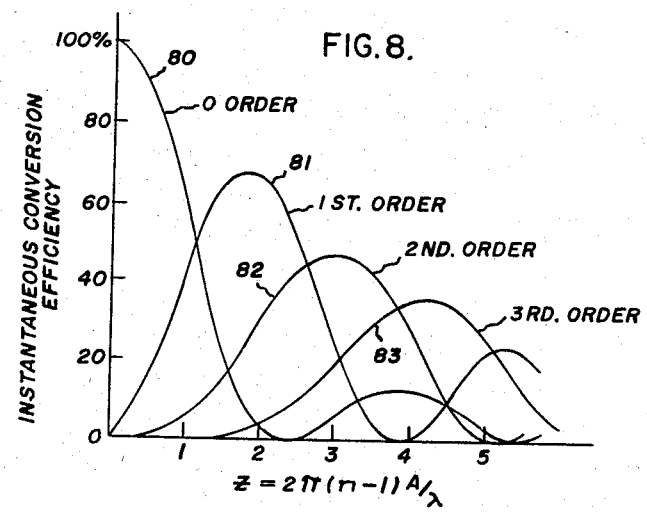
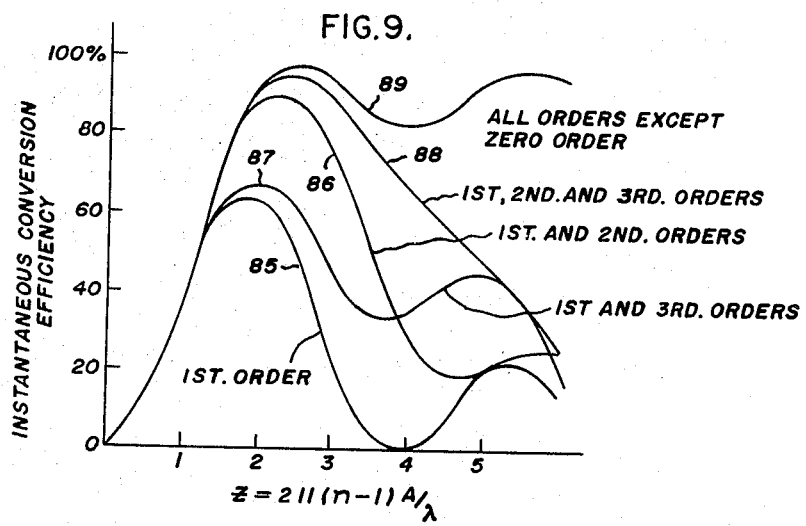
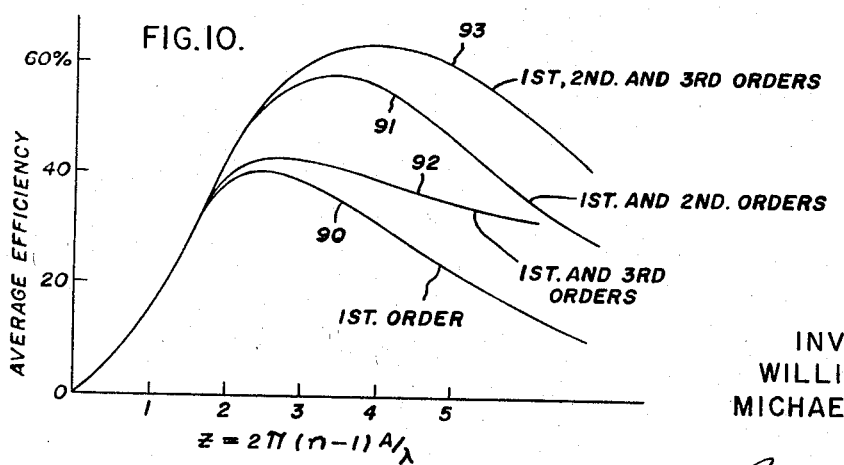

March 7, 1967  W. E. GOOD ET AL  3,308,230
MONOCHROME PROJECTION SYSTEM WITH FIRST
AND SECOND ORDER DIFFRACTION
Filed Dec. 18, 1964  6 Sheets-Sheet 6

POSITION OF DIFFRACTION
ORDERS OF RED AND BLUE
FORMED BY RED DIFFRACTION
GRATING IN RELATION TO VERTICAL
OUTPUT SLOTS AND BARS.

→ HORIZONTAL DISPLACEMENT

INVENTORS:
WILLIAM E. GOOD,
MICHAEL GRASER, JR.

BY *Julius J. Zuchelsky*
THEIR ATTORNEY.

United States Patent Office 3,308,230
Patented Mar. 7, 1967

3,308,230
MONOCHROME PROJECTION SYSTEM WITH FIRST AND SECOND ORDER DIFFRACTION
William E. Good, Liverpool, and Michael Graser, Jr., Fayetteville, N.Y., assignors to General Electric Company, a corporation of New York
Filed Dec. 18, 1964, Ser. No. 419,396
7 Claims. (Cl. 178—5.4)

The present invention relates to improvements in systems for the projection of images of the kind including a viscous light modulating medium deformable into diffraction gratings by electron charge deposited thereon in accordance with electrical signals corresponding to the images and relates particularly to such systems for the projection of both color and monochrome images.

One such system for controlling the intensity of a beam of light includes a viscous light modulating medium which is adapted to deviate each portion of the beam in accordance with deformations in a respective point thereof on which the portion is incident, and a light mask having a plurality of apertures therein disposed to mask the beam of light in the absence of any deformation in the light modulating medium and to pass light in accordance with the deformations in said medium. The intensity of the portions of the beam of light deviated by the light modulating medium and passed through the apertures of the light mask varies in accordance with the magnitude of deformations produced in the light modulating medium.

The light modulating medium may be a thin light transmissive layer of viscous fluid in which the electron beam forms phase diffraction gratings having adjacent valleys spaced apart by a predetermined distance. Each portion of light on a respective small area or point of the medium is deviated in a direction orthogonal to the direction of the valleys. The intensity of the deviated light is a function of the depth of the valleys.

The phase diffraction grating may be formed in the layer of oil by the deposition thereon of electrical charges, for example, by a beam of electrons. The beam may be directed on the medium and deflected along the surface thereof in one direction at successively spaced intervals perpendicular or orthogonal to the one direction. Concurrently the rate of deflection in the one direction may be altered periodically at a frequency considerably higher than the frequency of scan to produce alterations in the electrical charges deposited on the medium along the direction of scan. The concentrations of electrical charge in corresponding parts of each line of scan form lines of electrical charge which are attracted to a suitably disposed oppositely charged transparent conducting plate on the other surface of the layer thereby producing a series of valleys therein. As the periodic variations in the period of scan are changed in amplitude, the depth of the valleys are correspondingly changed. Thus, with such a means each element of a beam of light impinging on one of the opposite surfaces of the layer is deflected orthogonally to the direction of the valleys or lines therein by an amount determined by the spacing between adjacent valleys, and the intensity of an element of deflected light is a function of the depth of such valleys.

When a beam of light, which is constituted of primary color components of light, is directed on a diffraction grating, light impinging therefrom is dispersed into a series of spectra on each side of a line representing the direction or path of undeviated light. The first pair of spectra on each side of the undeviated path of light is referred to as first order diffraction pattern. The next pair of spectra on each side of the undiffracted path is referred to as second order diffraction pattern, and so on. In each order of the complete spectrum the blue light is deviated the least, and the red light the most. The angle of deviation of red light in the first order light pattern, for example, is that angle measured with reference to the undeviated path at which the ratio of the wavelength of red light to the line to line spacings of the grating is equal to the sine of the deviation angle. The angle of deviation of the red light in the second order pattern is that angle at which the ratio of twice the wavelength of red light to the line to line spacing of the grating is equal to the sine of the angle, and so on.

If the beam of light is oblong in shape, each of the spectra is constituted of color components which are oblong in shape. If the diffracted light is directed onto a mask having a wide transparent slot appropriately located on the mask, the light passed through the slots is essentially reconstituted white light, each portion of which is of an intensity corresponding to the depth of the valleys illuminated by such portion. Such a system as described would be suitable for the projection of television images in black and white. The line to line spacing of the grating formed in each part of the light modulating medium is the same and determines the deviation of light under conditions of modulation. The depth of the valleys formed in each part of the light modulating medium varies in accordance with the amplitude of the modulating signal and determines the intensity of light in each deviated portion of the beam.

Systems have been proposed for the projection of three primary colors by a common viscous light modulating medium in which light deviating deformations are produced therein by a common electron beam modulated in various ways to produce a set of three diffraction gratings on the common media, each corresponding to a respective primary color component. The line to line spacing of each of the diffraction gratings are different thus producing a different angle of deviation for each of the primary color components. The depth of the deformation is varied in accordance with a respective primary color signal to produce corresponding variations in the intensity of light in the first, second and higher diffraction orders. The apertures in a light output mask are of predetermined extent and at locations in order to selectively pass the desired orders of primary color components of the diffraction spectrum. The line to line spacing of each of the three primary diffraction gratings determines the width and location of the cooperating slot to pass the respective primary color component when a diffraction grating corresponding to that color component is formed in the light modulating medium.

In the kind of system under consideration an electron beam is modulated by a plurality of carrier waves of fixed and different frequency each corresponding to a respective color component, the amplitude of each of which is modulated in accordance with an electrical signal corresponding to the intensity of the respective color component to form a plurality of diffraction gratings having valleys extending in the same direction, each grating having a different line to line spacing corresponding to a respective primary color component and the valleys thereof having an amplitude varying in accordance with the intensity of a respective primary color component. If the primary color components selected are blue, green and red, and the carrier frequency associated with each of these colors is proportionately lower, the deviation in the first order spectrum of blue component of white light by the blue diffraction grating, and similarly the deviation of the green component by the green diffraction grating, and the deviation of the red component by the red diffraction grating, can be made to correspond quite closely. Accordingly, a pair of transparent slots placed in the light mask in position, relative to the undeviated path of light, corresponding to that deviation and of just sufficient orthogonal extent, pass all of the primary components. The intensity of each of the primary color components in the beam of light emerging from the mask would vary in accordance with the amplitude of a respective electrical signal corresponding to the respective color component. Projection of such a beam reconstitutes in color the image corresponding to the electrical signals.

In a modification of the system described above and to be considered in detail herein, one set of grating lines is formed perpendicular or orthogonal to the other sets of grating lines. In such a system light filters and focusing elements direct red and blue light from a source of white light through the light modulating medium onto appropriate opaque and transparent portions of the light output mask cooperatively associated with the red and blue diffraction gratings formed in the light modulating medium to produce the desired operation explained above and direct green light from the source of white light on the common area of the light modulating medium and onto appropriate opaque and transparent portions in the light output mask which are cooperatively associated with the green diffraction grating formed in the light modulating medium. The red and blue diffraction gratings are formed by appropriate velocity modulation of the electron beam in the direction of horizontal scan. The natural grating formed by the horizontal scan of the electron beam serves as a green diffraction grating.

It is desirable in the usage of such systems as described above to be able to project images in monochrome or black and white as well as in color, as desired. While a system using three diffraction gratings for the projection of color images could also be used for the projection of monochrome images the light transmission characteristics of each of the three primary color channels would have to be exactly balanced for each picture element otherwise the sum of the light from each of the three channels would not add in the proper proportion to produce reconstituted white light of proper hue and intensity. Due to such effect as non linearities in the transfer characteristics of the channels such balance to produce an acceptable monochrome picture is difficult to achieve. Accordingly, for good monochrome projection it is necessary to resort to a single grating system such as first described above.

It is an object of the present invention to provide a versatile light valve projection system for the projection of either color or monochrome images of high quality.

It is also an object of the present invention to provide a light valve projection system for the projection of monochrome images of high quality and with good efficiency.

The novel features believed to be characteristic of the invention are set forth in the appended claims. The invention itself, together with further objects and advantages thereof, may best be understood by the following description taken in connection with the following drawings in which:

FIGURE 3 is an end view taken along section 3—3 of the system of FIGURE 1 showing the second lenticular lens plate and the input mask thereof of the system of FIGURE 1.

FIGURE 4 is an end view taken along section 4—4 of the system of FIGURE 1 showing the first lenticular lens plate thereof.

FIGURE 5 is an end view taken along section 5—5 of the system of FIGURE 1 showing the light output mask thereof.

FIGURE 6 is an end view taken along section 6—6 of the system of FIGURE 1 showing the filter element thereof.

FIGURE 7 shows a plan view of a light mask substituted for the filter of FIGURE 6 in the apparatus of FIGURE 1 to render the system suitable for monochrome image projection in accordance with the present invention.

FIGURE 8 shows graphs of the instantaneous conversion efficiency of the light diffracting gratings formed in the light modulating medium as a function of the depth of modulation or deformation for various diffraction orders.

FIGURE 9 shows graphs of the instantaneous conversion efficiency of the light diffracting gratings formed in the light modulating medium as a function of the depth of modulation or deformation for various combinations of diffraction orders.

FIGURE 10 shows graphs of the average efficiency for linear decay of the light diffraction gratings formed in the light modulating medium as a function of the depth of modulation or deformation for various combinations of diffraction orders.

FIGURE 14 shows a plan view of a light input mask plate substituted for the input mask plate of FIGURE 3 for use in monochrome projection avoiding the need for the mask of FIGURE 7.

FIGURE 15 shows a plan view of a light output mask substituted for the output mask of FIGURE 5 for use in conjunction with the mask of FIGURE 14 in the system of FIGURE 1.

Figure 1:
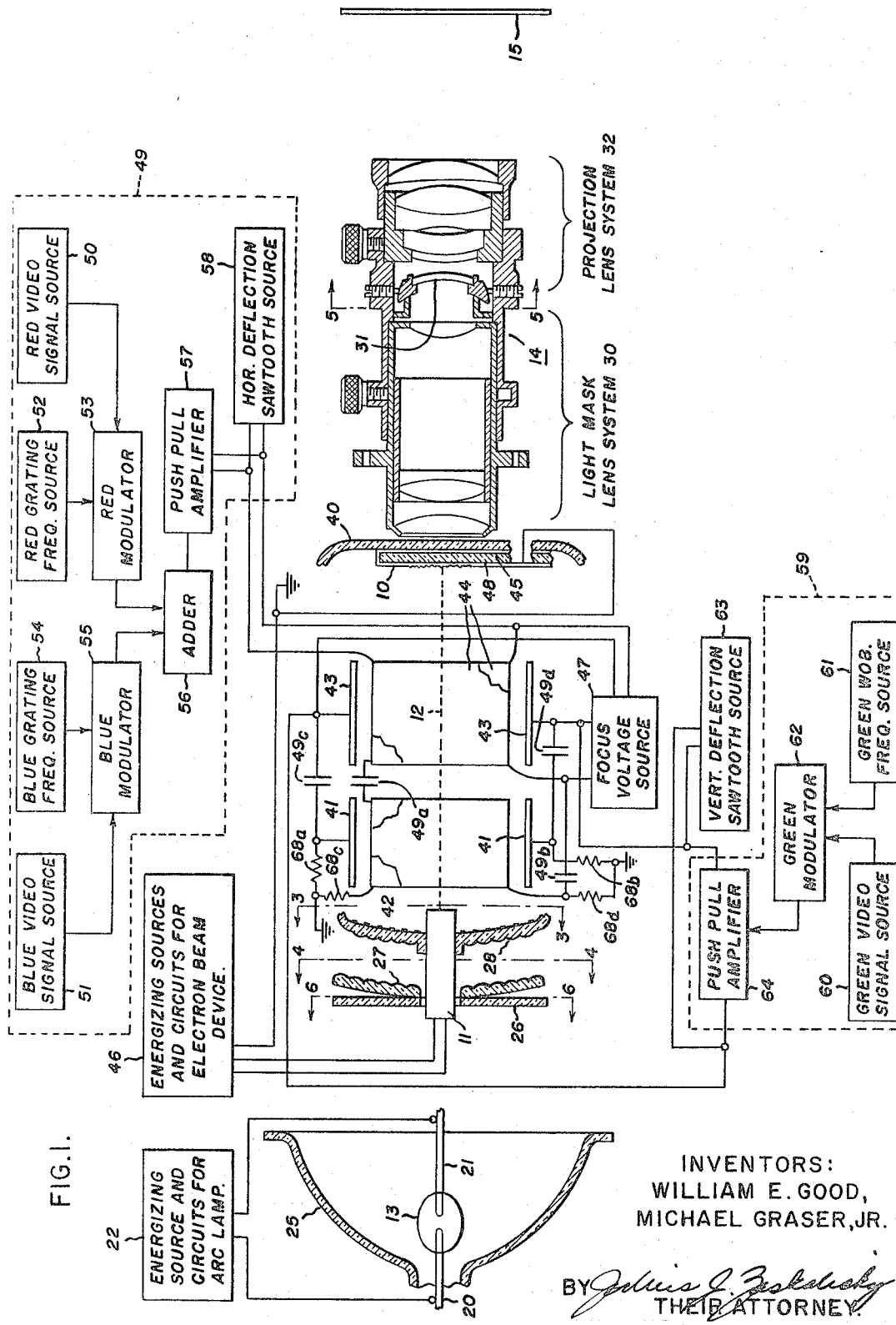
FIGURE 1 is a schematic diagram of the optical and electrical elements of a system useful in explaining the present invention.

Referring now to FIGURE 1 there is shown a simultaneous color projection system comprising an optical channel including a light modulating medium 10, and an electrical channel including an electron beam device 11, the electron beam 12 of which is coupled to the light modulating medium 10 in the optical channel. Light is applied from a source of light 13 through a plurality of beam forming and modifying elements onto the light modulating medium 10. In the electrical channel electrical signals varying in magnitude in accordance with the point by point variation in intensity of each of the three primary color constituents of an image to be projected are applied to the electron beam device 11 modulate the beam thereof in the manner to be more fully described below, to produce deformations in the light modulating medium which modify the light transmitted by the modulating medium in point by point correspondence with the image to be projected. An apertured light mask and projection lens system 14, which may consist of a plurality of lens elements, on the light output side of the light modulating medium function to cooperate with the light modulating medium to control the light passed by the optical channel and also to project such light onto a screen 15 thereby reconstituting the light in the form of an image.

More particularly, on the light input side of the light modulating medium 10 are located the source of light 13 consisting of a pair of electrodes 20 and 21 between which is produced white light by the application of voltage therebetween from source 22, an elliptical reflector 25 positioned with the electrodes 20 and 21 located at the adjacent focus thereof, a generally circular filter member 26 having a vertically oriented central portion adapted to pass substantially only the red and blue, or magenta, components of white light and having segments on each side of the central portion adapted to pass only the green component of white light, a first lens plate member 27 of generally circular outline which consists of a plurality of lenticules stacked in a horizontal and vertical array, a second lens plate and input mask member 28 of generally circular outline also having a plurality of lenticules on one face thereof stacked in horizontal and vertical array, and the onput mask on the other face thereof. The elliptical reflector 25 is located with respect to the light modulating medium 10 such that the latter appears at the other or remote focus thereof. The central portion of the input mask portion of member 28 includes a plurality of vertically extending slots between which are located a plurality of vertically extending bars. On the segments of the mask on each side of the central portion thereof are located a plurality of horizontally oriented slots or light apertures spaced between similarly oriented parallel opaque bars. The first plate member 27 functions to convert effectively the single arc source 13 into a plurality of such sources corresponding in number to the number of lenticules on the lens plate member 27, and to image the arc source on individual separate elements of the transparent slots in the input mask portion of member 28. Each of the lenticules on the lens plate portion of member 28 images a corresponding lenticule on the first plate member onto the active area of the light modulating medium 10. With the arrangement described efficient utilization is made of light from the source, and also uniform distribution of light is produced on the light modulating medium. The filter member 26 is constituted of the portions indicated such that the red and blue light components from the source 13 register on the vertically extending slots of the input mask member 28, and green light from the source 13 is registered on the horizontal slots of the input mask member 28.

On the light output side of the light modulating medium are located a mask imaging lens system 30 which may consist of a plurality of lens elements, and output mask member 31 and a projection lens system 32. The output mask member 31 has a plurality of parallel vertically extending slots separated by a plurality of parallel vertically extending opaque bars in the central portion thereof. The output mask member 31 also has a plurality of horizontally extending slots separated by a plurality of parallel horizontally extending opaque bars in a pair of segments on each side of the central portion thereof. In the absence of deformations in the light modulating medium 10, the mask lens system 31 images light from each of the slots in the input mask member 28 onto corresponding opaque bars on the output mask member 31. When the light modulating medium 10 is deformed, light is deflected or deviated by the light modulating medium, passes through the slots in the output mask member 31, and is projected by the projection lens system 32 onto the screen 15. The details of the light input optics of the light valve projection system shown in FIGURE 1 are described in the aforementioned copending patent application Serial No. 316,606, filed October 16, 1963, and assigned to the assignee of the present invention.

The output mask lens system 30 comprises four lens elements which function to image light from the slots in the input mask onto corresponding portions of the output mask in the absence of any physical deformation in the light modulating medium. The projection lens system 32 in combination with the light mask lens system 31 comprises a composite lens system for imaging the light modulating medium on a distant screen on which an image is to be projected. The projection lens system 32 comprises five lens elements. The plurality of lenses are provided in the light mask and projection lens system to correct for the various aberrations in a single lens system. The details of the light mask and projection lens system are described in patent application Serial No. 336,505, filed January 8, 1964, and assigned to the assignee of the present invention.

According to present day color television standards in force in the United States an image to be projected by a television system is scanned horizontally once every $\frac{1}{15735}$ of a second by a light-to-electrical signal converter, and vertically at a rate of one field of alternate lines every one-sixtieth of a second. Correspondingly, an electron beam of a light producing or controlling device is caused to move at a horizontal scan frequency of 15,735 cycles per second in synchronism with the scanning of the light converter, and to form thereby images of light varying in intensity in accordance with the brightness of the image to be projected. The pattern of scanning lines, as well as the area of scan, is commonly referred to as the raster.

Figure 2A:
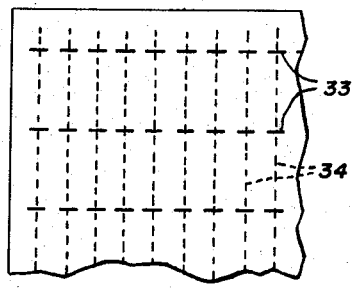
FIGURES 2A through 2F are a diagrammatic representation of the active area of the light modulating medium showing the horizontal scan lines and the location of charge with respect thereto for the various primary color channels of the system.
Figure 2B:
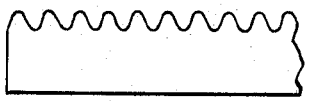

In FIGURE 2A is shown in schematic form a portion of such a raster in the light modulating medium along with the diffraction grating corresponding to the red color component. The size of the raster or whole area scanned in the embodiment is approximately 0.82 of an inch in height, and 1.10 of an inch in width. The horizontal dash lines 33 are the alternate scanning lines of the raster appearing in one of the two fields of a frame. The spaced vertically oriented dotted lines 34 on each of the raster lines, i.e., extending across the raster lines schematically represent concentrations of charge laid down by an electron beam to form the red diffraction grating in a manner to be described hereinafter, such concentrations occurring at equally spaced intervals on each line, corresponding parts of each scanning line having similar concentrations therby forming a series of lines of charge equally spaced from adjacent lines which cause the formation of valleys in the light modulating medium, the depth of such valleys, of course, depending upon the concentration of charge. Such a wave is produced by a signal superimposed on an electron beam moving horizontally at a frequency 15,735 cycles per second, a carrier wave, of smaller amplitude but of fixed frequency of the order of 16 megacycles per second thereby producing a line-to-line spacing in the grating of approximately $\frac{1}{760}$ of an inch. The high frequency carrier wave causes a velocity modulation of the beam thereby causing the beam to move in steps, and hence to lay down the pattern of charge schematically depicted in this figure with each valley extending in the vertical direction and adjacent valleys being spaced apart by a distance determined by the carrier frequency as shown in greater detail in FIGURE 2B which is a side view of FIGURE 2A.

Figure 2C:
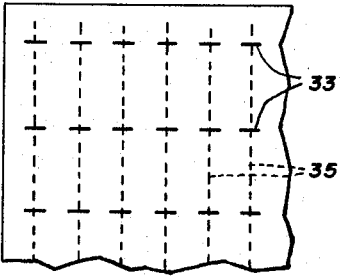
Figure 2D:
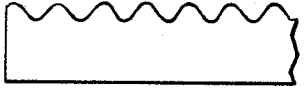

In FIGURE 2C is shown a section of the raster on which a blue diffraction grating has been formed. As in the case of the red diffraction grating, the vertically oriented dotted lines 35 of each of the electron beam scan lines 33 represent concentrations of charge laid down by the electron beam. The grating line to line spacing is uniform, and the amplitude thereof varies in accordance with the amount of charge present. The blue grating is formed in a manner similar to the manner of formation of the red grating, i.e., a carrier frequency of amplitude smaller than the horizontal deflection wave is applied to produce a velocity modulating in the horizontal direction of the electron beam, at that frequency rate, thereby to lay down charges on each line that are uniformly spaced with the line to line spacing being a function of the frequency. A suitable frequency is nominally 12 megacycles per second. In FIGURE 2D is shown a side view of the section of the light modulating medium showing the deformations produced in the medium in response to the aforementioned lines of charge.

Figure 2E:
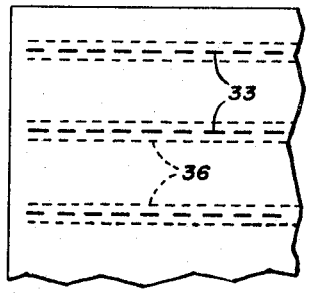
Figure 2F:
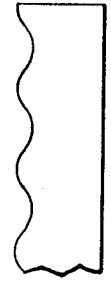

In FIGURE 2E is shown a section of the raster of the light modulating medium on which the green diffraction grating has been formed. In this figure are shown the alternate scanning lies 33 of a frame or adjacent lines of a field. On each side of the scanning lines are shown dotted lines 36 schematically representing concentrations of charge extending in the direction of the scanning lines to form a diffraction grating having lines or valleys extending in the horizontal direction. The green diffraction grating is controlled by modulating the electron scanning beam at very high frequency, nominally 48 megacycles in the vertical direction, i.e., perpendicular to the direction of the lines, to produce a uniform spreading out or smearing of the charge transverse to the scanning direction of the beam, the amplitude of the smear in such direction varying proportionately with the amplitude of the high frequency carrier signal, which amplitude varies inversely with the amplitude of the green video signal. The frequency chosen is higher than either the red or blue carrier frequency to avoid the undesired interaction with signals of other frequencies of the system including the video signals and the red and blue carrier waves, as will be more fully explained below. With low modulation of the carrier wave more charge is concentrated in a line along the center of the scanning direction than with high modulation thereby producing a greater deformation in the light modulating medium at that part of the line. In short, the natural grating formed by the focussed beam represents maximum green modulation or light field, and the defocussing by the high frequency modulation deteriorates or smears such grating in accordance with the amplitude of such modulation. For good dark field the grating is virtually wiped out. FIGURE 2F is a sectional view of the light modulating medium of FIGURE 2E showing the manner in which the concentrations of charge along the adjacent lines of a field function to deform the light modulating medium into a series of valleys and peaks representing a phase diffraction grating.

Thus FIGURES 2A through 2F depict the manner in which a single electron beam scanning the raster area in the horizontal direction at spaced vertical intervals may be simultaneously modulated in velocity in the horizontal direction by two amplitude modulated carrier waves, both substantially higher in frequency than the scanning frequency, one substantially higher than the other, to produce a pair of superimposed vertically extending phase diffraction gratings of fixed spacing thereon, and also may be modulated in the vertical direction by an amplitude modulated carrier wave to produce a third grating having lines of fixed line to line spacing extending in the horizontal direction orthogonal to the direction of grating lines of the other two gratings. By amplitude modulating the three beam modulating signals corresponding point by point variations in the depth of the valleys or lines of the diffraction grating are produced. Thus, by applying the three signals indicated, each simultaneously varying in amplitude in accordance with the intensities of a respective primary color component of the image to be projected, three primary diffraction gratings are formed, the point by point amplitude of which vary with the intensity of a respective color component.

As used in this specification with reference to the specific raster area of the light modulating medium, a point represents an area of the order of several square mils and corresponds to a picture element. For the faithful reproduction or rendition of a color picture element three characteristics of light in respect to the element need to be reproduced, namely, luminance, hue, and saturation. Luminance is brightness, hue is color, and saturation is fullness of the color. It has been found that in general a system such as the kind under consideration herein that one grating line is adequate to function for proper control of the luminance characteristic of a picture element in the projected image and that about three to four lines are a minimum for the proper control of hue and saturation characteristics of a picture element.

Phase diffraction gratings have the property of deviating light incident thereon, the angular extent of the deviation being a function of the line to line spacing of the grating and also of the wavelength of light. For a particular wavelength a large line to line spacing would produce less deviation than a small line to line spacing. Also for a particular line to line spacing short wavelengths of light are deviated less than long wavelengths of light. Phase diffraction gratings also have the property of transmitting deviated light in varying amplitude in response to the amplitude or depth of the lines or valleys of the grating. Accordingly it is seen that the phase diffraction grating is useful for the point by point control of the intensity of the color components in a beam of light. The line to line spacing of a grating controls the deviation, and hence color component selection, and the amplitude of the grating controls the intensity of such component. In the specific system under consideration herein substantially the first and second diffraction orders of light are utilized in the red and blue primary color channels, and the first and third diffraction orders of light are used in the green primary color channel. The manner in which the instantaneous efficiency of the first, second and third orders vary with depth of deformation, and also the manner in which the sums of various ones of the orders varies with depth of deformation are described in connection with FIGURES 8 and 9. The manner in which the average efficiency for combinations of various ones of the first, second and third orders varies with depth of deformation will be described in detail in connection with FIGURE 10.

Referring again to FIGURE 1, an electron writing system is provided for producing the phase diffraction gratings in the light modulating medium, and comprises an evacuated enclosure 40 in which are included an electron beam device 11 having a cathode (not shown), a control electron (not shown), and a first anode (not shown), a pair of vertical deflection plates 41, a pair of horizontal deflection plates 42, a set of vertical focus and deflection electrodes 43, a set of horizontal focus and deflection electrodes 44, and the light modulating medium 10. The cathode, control electrode, and first anode along with the transparent target electrode 48 supporting the light modulating medium 10 are energized from a source 46 to produce in the evacuated enclosure an electron beam that at that point of focussing on the light modulating medium is of small dimensions (of the order of a mil), and of low current (a few microamperes), and high voltage. Electrodes 41 and 42, connected to ground through respective high impedances 68a, 68b, 68c, and 68d provided a deflection and focus function, but are less sensitive to applied deflection voltages than electrodes 43 and 44. The electrodes 43 and 44 control both the focus and deflection of the electron beam in the light modulating medium in a manner to be more fully explained below.

A pair of carrier waves which produce the red and blue gratings, in addition to the horizontal deflection voltage are applied to the horizontal deflection plates 42. The electron beam, as previously mentioned, is deflected in steps separated by distances in the light modulating medium which are a function of the grating spacing of the desired red and blue diffraction gratings. The period of hesitation at each step is a function of the amplitude of the applied signal corresponding to the red and blue video signals. A high frequency carrier wave modulated by the green video signal, in addition to the vertical sweep voltage, is applied to the vertical deflection plates 41 to spread the beam out in accordance with the amplitude of the green video signal as explained above. The viscous light modulating medium 10 is supported on transparent member 45 coated with a transparent conductive layer 48 adjacent the medium such as indium oxide. The viscosity and other properties of the light modulating medium are selected such that the deposited charges produce the desired deformations in the surface and such that the amplitude of the deformations decay to a small value after each field of scan thereby permitting alternate variations in amplitude of the diffraction grating at the sixty cycle per second field scanning rate. The conductive layer 48 is maintained at ground potential and constitutes the target electrode for the electron writing system. Of course, in accordance with television practice the control electrode is also energized after each horizontal and vertical scan of the electron beam by a blanking signal obtained from a conventional blanking circuit (not shown).

Above the evacuated enclosure 40 are shown in functional blocks included in dotted box 49 the source of the horizontal deflection and beam modulating voltages which are applied to the horizontal deflection plates to produce the desired horizontal deflection. This portion of the system comprises a source of red video signal 50, and a source of blue video 51 each corresponding, respectively, to the intensity of the respective primary color component in a television image to be projected. The red video signal from the source 50 and a carrier wave from the red grating frequency source 52 are applied to the red modulator 53 which produces an output in which the carrier wave is modulated by the red video signal. Similarly, the blue video signal from source 51 and carrier wave from the blue grating frequency source 54 is applied to the blue modulator 55 which develops an output in which the blue video signal amplitude modulates the carrier wave. Each of the amplitude modulated red and blue carrier waves are applied to an adder 56 the output of which is applied to a push-pull amplifier 57. The output of the amplified 57 is applied to the horizontal plates 44. The output of the horizontal deflection sawtooth source 58 is also applied to plates 44 and to plates 42 through capacitors 49a and 49b.

Below the evacuated enclosure 40 are shown in functional blocks included in dotted box 59 the circuits of the vertical deflection and beam modulation voltages which are applied to the vertical deflection plates to produce the desired vertical deflection. This portion of the system comprises a source of green video signal 60, a green grating or wobbulating frequency source 61 providing high frequency carrier energy, and a modulator 62 to which the green video signal and carrier signal are applied. An output wave is obtained from the modulator having a carrier frequency equal to the carrier frequency of the green grating frequency source and an amplitude varying inversely with the amplitude of the green video signal. The modulated carrier wave and the output from the vertical deflection source 63 are applied to a conventional push-pull amplifier 64, the output of which is applied to vertical plates 43 to produce deflection of the electron beam in the manner previously indicated. The output of the vertical deflection sawtooth source 63 is also applied to the plates 43 and to plates 41 through capacitors 49c and 49d.

A circuit for accomplishing the deflection and focusing functions described above in conjunction with the deflection and focusing electrode system comprising two sets of four electrodes such as shown in FIGURE 1 is shown and described in a copending patent application Serial No. 335,117, filed January 2, 1964, and assigned to the assignee of the present invention. An alternative electrode system and associated circuit for accomplishing the deflection and focusing function is described in the aforementioned copending patent application, Serial No. 343,990 now patent No. 3,272,917.

As mentioned above the red and blue channels make use of the vertical slots and bars and the green channel makes use of the horizontal slots and bars. The width of the slots and bars, in one arangement or array is one of set values and the width of the slots and bars in the other arrangement is another set of values. The raster area of the modulating medium may be rectangular in shape and has a ratio of height to width or aspect ratio of three to four in accordance with television standards in force in the United States. The center-to-center spacing of slots in the horizontal array is made three-fourths the center-to-center spacing of the slots in the vertical array. Each of the lenticules in each of the lenticular plates are also so proportioned, i.e., with height to width ratio of three to four. The lenticules in each plate are stacked into horizontal rows and vertical columns. Each of the lenticules in one plate are of one focal length and each of the lenticules on the other plate are of another focal length. The filter element may be constituted to have three sections registering light of red and blue color components in the central portion of the input mask and green light in the side sector portions as will be apparent from considering FIGURE 3.

In FIGURE 3 is shown a view of the face of the second lenticular lens plate and input mask 28 as seen from the raster area of the modulating medium or along section 3—3 of FIGURE 1. In this figure the vertical oriented slots 70 are utilized in the controlling of the red and blue light color components in the image to be projected. The horizontally extending slots 71 located in the sector area in the input mask on each side of the central portion thereof function to cooperate with the light modulating medium and light output mask to control the green color component in the image to be projected. The ratio of the center-to-center spacing of the horizontal slots 71 to the center-to-center spacing of the verticle slots 70 is three-fourths. The rectangular areas enclosed by the vertical and horizontal dash lines 72 and 73 are the boundaries for the individual lenticules appearing on the opposite face of the plate 28. The focal length of each of the lenticules is the same. The center of each of the lenticules lies in the center of an element of a corresponding slot.

FIGURE 4 shows the first lenticular lens plate 27 taken along section 4—4 of FIGURE 1 with horizontal rows and vertical columns of lenticules 74. Each of the lenticules of this plate cooperates with a correspondingly positioned lenticule on the second lenticular lens plate shown in FIGURE 3 in the manner described above. Each of the lenticules on plate 27 have the same focal length which is different from the focal length of the lenticules on the second lenticular plate 28.

FIGURE 5 shows the light output mask 31 of FIGURE 1 taken along section 5—5 thereof. This mask consists of a plurality of vertically extending transparent slots 75 and opaque bars 76 in a central vertically extending section of the mask and a plurality of horizontally extending transparents slots 77 and opaque bars 78 in each of two sectors of the spherical mask lying on each side of the central portion thereof. As mentioned previously the slots and bars from the output mask are in a predetermined relationship to the slots and bars of the input mask.

Referring now to FIGURE 6 there is shown a plan view of the filter element 26 of FIGURE 1. The element comprises a central section 106 which passes magenta light and blocks green light, and a pair of side segments 79a and 79b horizontally disposed with respect to the central section which passes green light and blocks magenta light. The filter element 26 is oriented so that the central section thereof registers with the vertically oriented slots in the input mask 28, and the side segments are oriented with the side segments of the input mask. For the projection of monochrome images such filter element 26 is removed and accordingly is constituted of two halves which may be separated along the line 79c or along the horizontal as desired to facilitate its movement. In its place a mask 101 such as shown in FIGURE 7 is inserted. Such mask is constituted of a central transparent section 102 which corresponds to the section 106 of the filter of FIGURE 6 and a pair of opaque side segments 103 and 104 horizontally disposed on each side of the central section. The mask is constituted of two sections which may be separated vertically down the center along the line 105 or horizontally as desired so that the mask may be inserted in the apparatus of FIGURE 1 in a position occupied by the filter 26, the transparent portion registering with the portion of the input mask having the vertical slots, and the opaque side segments registering with the portion of the input mask having the horizontal slots. With such modification then white light is imaged through the vertical slots of input mask on plate 28 onto the light modulating medium 10.

Referring now to FIGURE 8 there are shown graphs of the instantaneous conversion efficiency of the light diffracting grating formed in the light modulating medium as a function of the depth of modulation or deformation of the light modulating medium for various diffraction orders. In this figure instantaneous conversion efficiency for light directed onto the light modulating medium is plotted along the ordinate in percent and the deformation function Z, where $$Z = 2\pi(n-1)A/\lambda$$

is plotted along the abscissa. In the above relationship A represents the peak amplitude or depth of deformation, $\lambda$ represents the wave length of light involved and $\eta$ represents the index of the light modulating medium. Graphs 80, 81, 82, and 83 show such relationships for the zero, the first, the second, and the third orders of diffracted light, respectively. In connection with this figure it is readily observed that when the light modulating medium is undeformed that all of the light is concentrated in the zero order which represents the undiffracted path of the light. Of course, the light passing through the light modulating medium would be deviated slightly by refraction of the light modulating medium as normally the index of refraction of the light modulating medium is different from the index of refraction of vacuum or air surrounding the medium, and is conveniently selected to be approximately in the range of refraction of indices of the material of the various vitreous optical elements utilized in the system. The output mask is positioned in relationship to the input mask such that when the light modulating medium is undeformed the slots of the input mask are imaged on the bars of the output mask and thus the slight refraction effects that occur are allowed for. As the depth of modulation for a given grating is increased, progressively more light appears in the various diffraction orders higher than the zero order. Progressively as the peak efficiency of the fist, second and higher orders of light is reached the value of the maximum efficiency of the higher order of light becomes progressively smaller. As can be readily seen from the graphs the maximum efficiencies of light in the first order, second and third orders is approximately 67 percent, 47 percent, and 37 percent, respectively.

In FIGURE 9 are shown graphs of the instantaneous conversion efficiency versus Z the function of the depth of modulation set forth above, for various combinations of diffraction orders. In this figure instantaneous conversion efficiency is plotted in percent along the ordinate, and the parameter Z is plotted along the abscissa. Graph 85 shows the manner in which the instantaneous conversion efficiency of the first order increases when the depth of modulation reaches a peak at approximately 67 percent and thereafter declines. Graph 86 shows the manner in which the instantaneous conversion efficiency for the sum of the first and second orders of diffracted light increases reaching a peak at approximately 93% and thereafter declines. Similarly, graph 87 shows the manner in which the instantaneous conversion efficiency of the diffraction grating varies for the sum of the first and third orders increases reaches a peak at approximately 69% and thereafter declines. Finally, graph 88 shows the manner in which the instantaneous conversion efficiency of the sum of the first, second and third orders of light increases to a peak of approximately 98% and thereafter declines. Graph 89 shows instantaneous conversion efficiency of the sum of all orders except the zero order.

In FIGURE 10 are shown a group of graphs on the average conversion efficiency for the various combinations of diffraction orders as a function of the amplitude of deformation. The average conversion efficiency is represented in percent along the ordinate, and amplitude in terms of the aforementioned parameter Z is plotted along the abscissa. For the proper operation of the system of FIGURE 1 it is necessary for the light modulating medium to retain the diffraction deformation produced therein over a period comparable to the period of a scanning field. Ideally, each point of the light modulating medium should retain the deformation unattenuated until it is subject to a new deformation in response to the modulating signal. Practically, such an ideal situation cannot be met as the charge on the light modulating medium decays and thereby permits the diffraction patterns in the light modulating medium to decay. Under such practical conditions it is desirable for the deformations to decay to a small value over the period of a field of the television scanning process so that new deformation information can be applied to the light modulating medium. The average efficiency graphs of FIGURE 10 are based on the decay of the deformations to approximately one-third their initial value over the period of a field. Accordingly, even the electron charge has been deposited by the electron beam to produce the deformation the existence of the deformation continues to diffract the light incident on the medium. Graphs 90, 91, 92, and 93 show, respectively the average efficiency of the first diffraction order, the sum of the first and second orders, the sum of the first and third orders, and the sum of the first, second and third orders.

Figure 11:
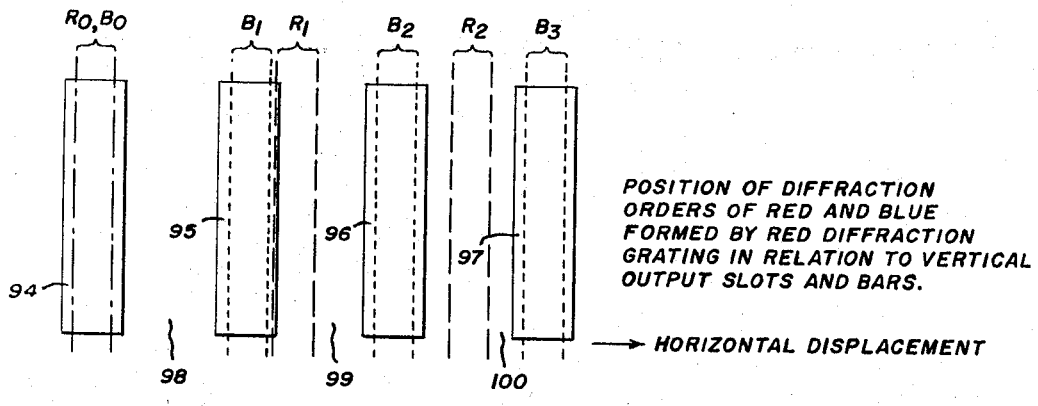
FIGURE 11 shows a diagram of a portion of a central section including the vertical slots and bars of the output mask of FIGURE 5 on which is superimposed various blocks representing various diffraction orders of the red and blue primary colors for the red grating.

Referring now to FIGURE 11 there is shown a portion of the bars and slots of the central section of the output mask 31 of FIGURES 1 and 5. Conveniently, four bars 94, 95, 96 and 97, and three slots 98, 99, and 100 are shown. More particularly, this figure illustrates where the various diffraction orders of red and blue light fall in relationship to the vertical bars and slots of the output mask. The horizontal coordinate of the diagram represents the horizontal displacement of the various orders of the red and blue primary colors in relationship to the slots and bars in the output mask. The color component is designated by an appropriate literal symbol, R for red, and B for blue. The diffraction order is indicated by the appropriate numerical subscript. As mentioned above, the light from a particular slot in the input mask in the absence of modulation in the light modulating medium falls on a particular bar in the output mask. Such a condition is represented by the lines bracketed $B_0$, $R_0$, where the separation of such lines bears a definite relationship to the width of the slot source of member 28 of FIGURE 3. As the longer wavelengths of light are deviated more by a diffraction grating of fixed line to line spacing, the first order image of red light, $R_1$, is deviated more than the first order image of blue light, $B_1$, as shown in the figure. Also, the progressively higher orders of diffracted light are deviated progressively more by the factor of the order of that light. Thus the second order red component is deviated twice the amount of deviation of first order red component, and similarly the second order of blue light is deviated twice the amount of the first order of blue light, and so on. What has been said for the various primary color components is also true for the wavelengths in that primary color component, i.e., the long wavelengths of red light are deviated more than the short wavelengths of red light, for example. Accordingly, the spacial spread of the image of the source is progressively greater for higher orders and also for longer wavelengths. Thus the source, which has a particular width in the zero order image, has progressively greater widths in the higher order images, the amount of increase depending not only on the order but also on the color component. The increased widths, for reasons of clarity, have not been shown in FIGURE 11.

The line to line spacing of the red diffraction grating, the line to line spacing of the blue diffraction grating, the nominal or central wavelength of red light, the nominal or central wavelength of blue light used in the system are particularly related in a manner to be more fully described below. By nominal or central wavelength of a primary color is meant a centrally chosen wavelength in the spectrum of wavelengths of that color as utilized in the system. Such nominal or central wavelength would represent the dominant wavelength of a primary color impinging on the light modulating medium. As all of the wavelengths in a primary color component are not equally transmitted by the optical elements on the output side of the light modulating medium, the dominant wavelengths of primary colors projected on the screen would be different from the dominant wavelengths of the primary color impinging on the light modulating medium; however, even so such dominant wavelengths are close to the central or nominal wavelengths as defined above. Typically, the nominal wavelengths for the blue color components may be 465 millimicrons and the nominal wavelength for the red primary color may be 620 millimicrons.

In the system of FIGURE 1 the ratio of the line to line spacing of the blue primary color diffraction grating to the line to line spacing of the red primary color diffraction grating is selected to be substantially equal to the ratio of the nominal wavelength of red light to the nominal wavelength of blue light. For the typical value mentioned above this ratio is equal to 1.33. For other considerations, important in the proper operation of the system and more fully treated in copending patent application Serial No. 366,005, filed May 8, 1964, and assigned to the assignee of the present invention, certain integral relations must exist in the relationship of the carrier frequency producing the red and blue diffraction gratings. When the ratio of the line to line spacing of the blue primary grating to the line to line spacing of the red primary gratings is 4 to 3 and the vertical bars of the output mask are positioned to block the various orders of blue light diffracted by the red diffraction grating allowing only the red light to come through, first, second, and third order of components of blue light fall on the first, second, and third bars 95, 96 and 97, respectively, removed from the bar 94 on which zero order light falls, and first order red light falls in the second slot 99 removed from the zero order bar 94 and second order red light falls on the third slot 100 removed from the zero order bar 94.

Similarly, when a blue diffraction grating appears in the light modulating medium the vertical bars of the output mask would block the various significant orders of red light and allow the blue light to pass through the slots, first order blue light falling substantially in the first slot 98, second and third order blue light falls respectively in slots 99 and 100. Thus, even though red light in addition to blue light falls on the diffraction grating the system of bars and slots shown blocks the red light and passes only the blue light. Further details on the operation of such a system of bars and slots are described and claimed in a copending patent application Serial No. 365,751, filed May 7, 1964, and assigned to the assignee of the present invention. Also in that application the manner in which the green diffraction grating cooperates with the horizontal slots in the side segments of the output mask to selectively pass green light in response to modulation of the grating, and in particular first and third order of green light is described.

In the apparatus of FIGURE 1 the circuits for producing the carriers which form the red and blue gratings in the light modulating medium, and the circuits for modulating such carrier to produce changes in depth of the gratings in response to the respective color signals are shown in dotted block 49. Also the circuits for producing the carrier wave and the modulation thereof to alter the amplitude of the green grating are shown in block 59.

Figure 12:
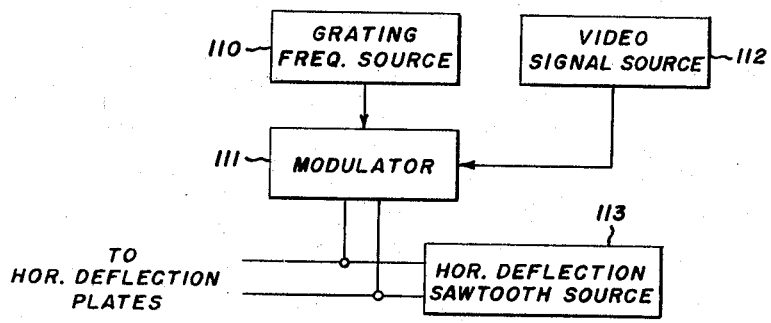
FIGURE 12 shows a block diagram of a circuit modification of the system of FIGURE 1 to render the system suitable for monochrome image projection in accordance with the present invention.

It has been mentioned above that a single diffraction grating is utilized for the projection of monochrome images. As the gratings associated with the red and blue primary colors are finer and hence would provide images of greater resolution, vertical gratings are selected for projection of the black and white image. To convert the apparatus of FIGURE 1 to apparatus which will project black and white images the green grating modulation circuit indicated in dotted block 59 is eliminated. Also, the circuits used for forming and modulating the red and blue gratings indicated in dotted block 49 are eliminated from the apparatus of FIGURE 1, and in its place the circuit shown in FIGURE 12 is substituted. This figure shows a grating frequency source 110 the output of which is applied to a modulator 111. Also applied to the modulator is monochrome video signal from source 112 which modulates the output of the grating frequency source 110 in the modulator 111. The output of the modulator 111 is combined with the output of the horizontal deflection sawtooth source 113 and is applied to the horizontal deflection plates.

In the color projection system of FIGURE 1 the red carrier frequency was selected nominally to be 16 megacycles, and the blue carrier frequency was selected to be nominally 12 megacycles. The slots and bars of the output mask 31 were selected in size and disposed in the horizontal direction as mentioned above in connection with FIGURE 11 such that on the appearance of a blue diffraction grating in the light modulating medium first and second order red light was blocked by the first and second bars on either side of a zero order bar and blue light was passed, and similarly when a red diffraction grating appeared in the light modulating medium blue light incident on the output mask 31 was blocked and red light passed. In accordance with one aspect of the present invention the frequency of the grating source is selected to be nominally one-third of the frequency of the blue grating frequency source so that essentially and substantially all first and second order light deviated by such grating is passed by the slots adjacent the zero order bar. Since such frequency is nominally 4 megacycles a grating produced by such a carrier modulation of the horizontal sweep would produce a grating which would deviate white light in the system of FIGURE 1, as modified by removal of the filter of FIGURE 6 and the insertion therein of the mask of FIGURE 7, in the manner shown in FIGURE 13.

Figure 13:
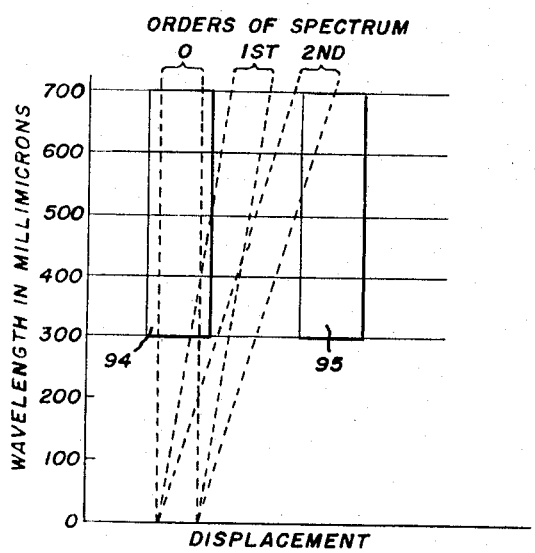
FIGURE 13 shows a diagram of a portion of the central section including the vertical bars and slots of the output mask of FIGURE 5 on which is superimposed various diffraction orders of white light for a particularly chosen grating in accordance with the present invention.

FIGURE 13 is a diagram of the diffraction spectra as they appear at the output bars. For the purpose of illustration output bars 94 and 95 of central section of the mask 31 of FIGURE 5 are used. The abscissa of the diagram represents the horizontal width of the bars and slots and displacement of diffraction spectra. The ordinate represents wavelengths of light. The dotted pairs of lines designated 0, 1st and 2nd indicate orders of white light. The separation of lines in each pair indicates source width. As shown, undeviated light would be completely blocked by the zero order bar 94. First order light diffracted by the monochrome grating formed by the four megacycle carrier is deviated as shown with the wavelengths of light below about 500 millimicrons being progressively blocked, and all wavelengths above about 500 millimicrons being passed. Similarly, second order light diffracted by such grating is entirely passed, up to about 550 millimicrons, and part of the light in such order being progressively blocked for the higher wavelengths of light. The line to line spacing is selected by use of appropriate carrier frequency such that substantially all light in the first and second orders in the vicinity of 550 millimicrons, the wavelengths to which the eye is most sensitive is passed, thus providing optimum efficiency. From the diagram of FIGURE 10 it is readily apparent that a system which utilizes only first order light is approximately 40% efficient whereas a system that utilized first and second order light is nearly 60% efficient.

Thus a system utilizing first and second order of diffraction is approximately 50% more efficient than a system which uses just first order diffracted light.

Another advantage in the present system in which first and second orders of light are utilized is that change in hue of the black and white image toward red or blue as brightness level of the projected image changes is minimized and kept within acceptable limits. The manner in which a system using first and second order light enables such advantage to be obtained can best be appreciated by considering first a system which uses just first order light. In FIGURE 8, as the depth of modulation, represented by A, the independent variable of which Z plotted along the abscissa is a function, is increased the average light transmission efficiency for a particular wavelength increases. However, as Z varies inversely with wavelength as well, blue light which is considerably shorter in wavelength than red light reaches a peak average efficiency at a substantially shallower depth than red light. Thus as the intensity of a projected image is increased the predominant hue of the picture would shift toward the red end of the spectrum. The same effect occurs in the second order diffraction light, i.e., as the depth of modulation is increased average efficiency of blue light peaks first followed by the peaking of the average efficiency of the red light; however such effect in second order light occurs at a greater depth of modulation than for first order light. A system utilizing first and second orders of diffracted light minimizes such color shift effects in the projected image as a function of the brightness of the projected image. In the first place the amount of light passed is substantially greater than with a first order system, as pointed out above, about 50% greater. Also, the peaking effect for the first order and for the second order occur at different depths of modulation corresponding to different levels of brightness of the projected image. Thus the relatitve change in average light transmission efficiency of the red and blue component when it occurs represents a smaller percent of change of the total light transmitted than in a system using just first order light. Accordingly, less resultant change or shift in the color of the monochrome image occurs.

A further advantage of the system depicted in FIGURE 13 is that better balance in the projected image is obtained. In a two order system such as described at shallow depths of modulation blue light in a particular diffraction order predominates and that at deep depths of modulation red light in a particular diffraction predominates due to the fact that instantaneous conversion efficiency is a function of wavelength, as is apparent from a consideration of the graph of FIGURE 8. In terms of projection performance this means low intensity portions of a projected image would tend to be bluish and high intensity portions would tend to be reddish. In the system of bars and slots depicted in FIGURE 13 such adverse effects are minimized in that part of first order blue light is blocked to achieve better color balance at shallow depth of modulation, and part of second order red light is blocked to achieve better color balance at deep depths of modulation.

A still further advantage of a system utilizing first and second orders is that it has greater dynamic range of average efficiency versus depth of modulation than a system utilizing just first order light. As can be seen from FIGURE 10 the average efficiency for a first order system is 40 percent and that efficiency occurs where the function Z has a value of 2. In a system using first and second orders the peak average efficiency occurs near 60 percent where the function Z has value between 3 and 4, and, in addition, the peak is fairly rounded. In terms of the projected image this means that at high levels of modulation, high lights are not lost or deemphasized as they may be in a system using essentially first order light.

As the normal frequency of four megacycles represents the upper range of the video modulating signal, in some systems a grating produced by such a frequency might be visible in the projected image. In order to eliminate or reduce such visibility, and effectively double the frequency of such grating alternate fields of scan may be displaced by a distance equal to one-half the grating line spacing. Such a result could be accomplished by shifting the phase of the carrier wave by 180 degrees, for example, by means of a circuit such as shown in patent application Serial No. 323,975, filed November 15, 1963, and assigned to the assignee of the present invention, or by other means well known in the art. Grating visibility could also be reduced by scaling up the center to center spacing of the output slots and making appropriate changes in slot width to enable a higher carrier frequency to be used. For example, with the center to center spacing of the output slots increased by a factor of two, the carrier frequency could be increased from nominally 4 megacycles to nominally 8 megacycles. Of course, the input mask system would be arranged to work into such an output mask system.

Referring now to FIGURE 14 there is shown an input mask plate similar to the input mask of FIGURE 3 except that the vertically extending slots 70 extend over the entire opening of the mask. Such an input plate would be suitable for use in the projector of FIGURE 1 where there is a desire to use such a system for the projection of only monochrome images. It would obviate the utilization of a mask such as shown in FIGURE 7 to block the light issuing from the side segments of the mask of FIGURE 3.

FIGURE 15 shows an output mask similar to the output mask of FIGURE 5 except that the slots 75 are distributed over the entire circular aperture of the mask. Such a mask would be used in conjunction with the input lens and mask plate of FIGURE 14.

The invention has been described in connection with slots of the output mask oriented perpendicular to the raster lines. It will be appreciated that slots parallel to the raster lines may as well be used, i.e., slots corresponding to the slots used in the green channel of the color projector. In such an arrangement the input and output mask system is designed so that natural gratings formed by the raster lines deviate first and second order white light through the slots. In such mode of operation, of course, the color filter is removed and magenta or vertically oriented input slots are blocked. In the alternative where the system is designed solely for the projection of monochrome images, the horizontally extending slots would be made to extend entirely over the mask areas. The monochrome video signal would be applied to the modulator corresponding to the green modulation of the color projector. As the number of raster lines are fixed the resolution obtained in the vertical direction by such system is limited. However, in order to obtain higher brightness in a monochrome projection system which is also used for color projection, both vertically and horizontally extending slots of the mask may be used simultaneously for the projection of monochrome images. In such a system it would be necessary, of course, to remove the dichroic filter of the color projector and to apply the monochrome video signal to the modulators controlling the vertical and horizontal grating lines.

While the invention has been described in specific embodiments, it will be appreciated that many modifications may be made by those skilled in the art, and we intend by the appended claims to cover all such modifications and changes as fall within the true spirit and scope of the invention.

What we claim as new and desire to secure by Letters Patent of the United States is:

1. A system for controlling the intensity of each point of a beam of light in response to a respective point in an electrical signal for projecting an image corresponding to said electrical signal comprising:
  a light modulating medium,
  means for directing said beam on said light modulating medium,
  means for producing a set of deformations in said medium to form a light diffraction grating having uniformly spaced lines extending in the same direction, means for controlling the amplitude of the lines of deformation of said grating in response to said electrical signals,
  a light mask positioned in the path of light transmitted from said medium, said mask having at least a pair of transparent portions, said portions being positioned on respective sides of the path of undeviated light from said medium,
  said transparent portions being positioned and of an extent in the direction of deviation to pass substantially only all first and second order light of all color components in said beam diffracted by said grating.

2. A system for controlling the intensity of each point of a beam of light in response to a respective point in an electrical signal for projecting an image corresponding to said electrical signal comprising:
  a light modulating medium,
  means to form a plurality of slots of light from said beam of light,
  means to direct said slots of light onto said medium,
  means for producing a set of deformations in said medium to form a light diffraction grating having uniformly spaced lines extending in the same direction parallel to the direction of said slots of light,
  means for controlling the amplitude of the lines of deformation of said grating in response to said electrical signals,
  a mask having a plurality of transparent slots separated by opaque bars,
  means for imaging each of said plurality of slots of light through said medium onto a respective opaque bar of said mask in the absence of deformations in said modulating medium,
  said transparent slots being positioned and of an extent in the direction of deviation to pass substantially only all first and second order light of all color components in said beam diffracted by said grating.

3. A system for controlling the intensity of each point of a beam of light in response to a respective point in an electrical signal for projecting an image corresponding to said electrical signal comprising:
  a transparent light diffracting medium deformable by electric charges deposited thereon,
  means for directing said beam of light on said medium,
  means for directing a beam of electrons upon said medium to produce such charges in said medium,
  means to deflect an electron beam over said medium in one direction in successive lines at an intermediate frequency rate and in another direction perpendicular to said one direction at a low frequency rate to form a raster thereon,
  means for deflecting said beam of electrons in said one direction over said medium by a fixed high frequency carrier wave modulated in amplitude by an electrical signal corresponding to the point by point intensity of an image to be projected to form a diffraction grating thereon having uniformly spaced lines of deformation directed in said other direction, said fixed frequency being many times greater than said intermediate frequency,
  a mask having a set of transparent and opaque portions,
  means for imaging light from said beam through said medium onto the opaque portions of said set in the absence of deformations in said modulating medium, the transparent portions of said set being positioned to pass light when a diffraction grating is formed in said medium in response to said electrical signals, the depth of deformation of said grating corresponding to the intensity point by point of the image to be projected,
  the frequency of said fixed frequency carrier producing a line to line spacing in said grating and said opaque and transparent portions being positioned as to cause substantially all of the first and second order spectrum of light to pass through said slots.

4. A system for controlling the intensity of each point of a beam of light in response to a respective point in an electrical signal for projecting an image corresponding to said electrical signal comprising:
  a transparent light diffracting medium deformable by electric charges deposited thereon,
  means for directing said beam of light on said medium,
  means for directing a beam of electrons upon said medium to produce such charges in said medium,
  means to deflect an electron beam over said medium in one direction at successive lines at an intermediate frequency rate and in another direction perpendicular to said one direction at a low frequency rate to form a raster thereon,
  means for deflecting said beam of electrons in said one direction over said medium by a fixed high frequency carrier wave modulated in amplitude by an electrical signal corresponding to the point by point intensity of an image to be projected to form a diffraction grating thereon having uniformly spaced lines of deformation directed in said other direction, said fixed frequency being many times greater than said intermediate frequency,
  a mask having a set of transparent and opaque portions, means for imaging light from said beam through said medium onto the opaque portions of said set in the absence of deformations in said modulating medium, the transparent portions of said set being positioned to pass light when a diffraction grating is formed in said medium in response to said electrical signals, the depth of deformation of said grating corresponding to the intensity point by point of the image to be projected,
  the frequency of said fixed frequency carrier being greater than the highest frequency of said electrical signal and producing a line to line spacing in said grating and said opaque and transparent portions being so positioned as to cause substantially all first and second order light to pass through said transparent portions.

5. A system for controlling the intensity of each point of a beam of light in response to a respective point in an electrical signal for projecting an image corresponding to said electrical signal comprising:
  a light modulating medium,
  means to form a plurality of slots of light from said beam of light,
  means to direct said slots of light onto said medium,
  means for producing a set of deformations in said medium to form a light diffraction grating having uniformly spaced lines extending in the same direction parallel to the direction of said slots of light,
  means for controlling the amplitude of the lines of deformation of said grating in response to said electrical signals,
  a mask having a plurality of transparent slots separated by opaque bars,
  means for imaging each of said plurality of slots of light through said medium onto a respective opaque bar of said mask in the absence of deformations in said modulating medium,
  said transparent slots being positioned and of an extent in the direction of deviation to pass only first and second order light of all color components in said beam diffracted by said grating, first order blue light and second order red light being appreciably blocked by said opaque bars.

6. A system for controlling the intensity of each point of a beam of light in response to a respective point in an electrical signal for projecting an image corresponding to said electrical signal comprising:

a transparent light diffracting medium deformable by electric charges deposited thereon, means for directing said beam of light on said medium, means for directing a beam of electrons upon said medium to produce such charges in said medium, means to deflect an electron beam over said medium in one direction in successive lines at an intermediate frequency rate and in another direction perpendicular to said one direction at a low frequency rate to form a raster thereon, means for deflecting said beam of electrons in said one direction over said medium by a fixed high frequency carrier wave modulated in amplitude by an electrical signal corresponding to the point by point intensity of an image to be projected to form a diffraction grating thereon having uniformly spaced lines of deformation directed in said other direction, said fixed frequency being many times greater than said intermediate frequency, a mask having a set of transparent slots and opaque bars, said slots and bars being oriented parallel to said one direction, means for imaging light from said beam through said medium onto the opaque bars of said set in the absence of deformations in said modulating medium, the transparent slots of said set being positioned to pass light when a diffraction grating is formed in said medium in response to said electrical signals, the depth of deformation of said grating corresponding to the intensity point by point of the image to be projected, the frequency of said fixed frequency carrier producing a line to line spacing in said grating and said opaque bars and transparent slots being so positioned as to cause substantially all of the first and second order spectrum of light to pass through said slots.

7. A system for controlling the intensity of each point of a beam of light in response to a respective point in an electrical signal for projecting an image corresponding to said electrical signal comprising:

a transparent light diffracting medium deformable by electric charges deposited thereon, means for directing said beam of light on said medium, means for directing a beam of electrons upon said medium to produce such charges in said medium, means to deflect an electron beam over said medium in one direction in successive lines at an intermediate frequency rate and in another direction perpedicular to said one direction at a low frequency rate to form a raster thereon, means for deflecting said beam of electrons in said one direction over said medium by a fixed high frequency carrier wave modulated in amplitude by an electrical signal corresponding to the point by point intensity of an image to be projected to form a diffraction grating thereon having uniformly spaced lines of deformation directed in said other direction, said fixed frequency being many times greater than said intermediate frequency.

a mask having a set of transparent slots and opaque bars, said slots and bars being oriented parallel to said other direction, means for imaging light from said beam through said medium onto the opaque bars of said set in the absence of deformations in said modulating medium, the transparent slots of said set being positioned to pass light when a diffraction grating is formed in said medium in response to said electrical signals, the depth of deformation of said grating corresponding to the intensity point by point of the image to be projected, the frequency of said fixed frequency carrier producing a line to line spacing in said grating and said opaque bars and transparent slots being so positioned as to cause substantially all of the first and second order spectrum of light to pass through said slots.

References Cited by the Examiner

UNITED STATES PATENTS 3,272,917  9/1966  Good et al. _____ 178—5.4

DAVID G. REDINBAUGH, *Primary Examiner.*

J. A. O'BRIEN, *Assistant Examiner.*